(12) United States Patent
Olguín Lora et al.

(10) Patent No.: US 8,631,865 B2
(45) Date of Patent: Jan. 21, 2014

(54) BIOTECHNOLOGICAL PROCESS FOR HYDROCARBON RECOVERY IN LOW PERMEABILITY POROUS MEDIA

(75) Inventors: Patricia Olguín Lora, Del. Gustavo A Madero (MX); Gladys Teresa Castorena Cortés, Del. Gustavo A Madero (MX); Teresa Guadalupe Roldán Carrillo, Del. Gustavo A Madero (MX); Norma Icoquih Zapata Peñasco, Del. Gustavo A Madero (MX)

(73) Assignee: Instituto Mexicano del Petroleo, Mexico City (MX)

( * ) Notice: Subject to any disclaimer, the term of this patent is extended or adjusted under 35 U.S.C. 154(b) by 384 days.

(21) Appl. No.: 12/973,258

(22) Filed: Dec. 20, 2010

(65) Prior Publication Data
US 2011/0146973 A1 Jun. 23, 2011

(30) Foreign Application Priority Data

Dec. 21, 2009 (MX) .................... MX/a/2009/014146

(51) Int. Cl.
*C09K 8/582* (2006.01)
*E21B 43/16* (2006.01)
*C12R 1/00* (2006.01)

(52) U.S. Cl.
USPC ........................................ 166/246; 435/41

(58) Field of Classification Search
None
See application file for complete search history.

(56) References Cited

U.S. PATENT DOCUMENTS

| | | | |
|---|---|---|---|
| 5,163,510 A | 11/1992 | Sunde | |
| 7,484,560 B2 * | 2/2009 | Lal et al. | 166/246 |
| 2007/0092930 A1 * | 4/2007 | Lal et al. | 435/41 |
| 2007/0181300 A1 * | 8/2007 | Busche et al. | 166/246 |
| 2009/0029879 A1 * | 1/2009 | Soni et al. | 507/201 |

FOREIGN PATENT DOCUMENTS

WO 2009/009382 1/2009

OTHER PUBLICATIONS

Babadagli, Development of mature oil fields—A review, J. Petroleum Science Engineering 57 (2007) 221-246.
Chisholm et al., Microbial enhanced oil recovery: interfacial tension and gas-induced relative permeability effects, SPE: 20481, 1990.
Mukherjee et al., Towards commercial production of microbial surfactants, Trends in Biotechnology, 2006, vol. 24, No. 11, pp. 509-515.

(Continued)

*Primary Examiner* — Angela M DiTrani
*Assistant Examiner* — Anuradha Ahuja
(74) *Attorney, Agent, or Firm* — Roylance, Abrams, Berdo & Goodman, L.L.P.

(57) ABSTRACT

A biotechnological process for enhancing oil recovery of 14 to 25° API oil contained in carbonate or sandstone rock systems with low permeability utilizes indigenous extremophile microorganisms (first culture) from the oil well, a second culture containing selected microorganisms and its metabolites (gases, acids, solvents and surfactants), to improve oil mobility. Under anaerobic conditions, such microorganisms are able to grow in temperatures from 60 to 95° C., at pressures from 7 to 154.6 kg/cm$^2$ and NaCl content from 5,000 to 45,000 ppm. Injection of indigenous microorganisms and a second culture for metabolites production into the well improves oil recovery after closing the system for periods from 5 to 10 days. The biotechnical process includes biostimulation (indigenous microorganisms) and bioaugmetation (second culture) to increase oil recovery.

13 Claims, 1 Drawing Sheet

(56) References Cited

OTHER PUBLICATIONS

Singh et al., Surfactants in microbiology and biotechnology: part 2. application aspects, Biotechnology Advances, 25 (2007), pp. 99-121.
Youssef et al., In situ biosurfactant production by *Bacillus* strains injected into a limestone petroleum reservoir, Applied and Environmental Microbiology, 2007, vol. 73, No. 4, pp. 1239-1247.
Maure et al., Microbial enhanced oil recovery pilot test in Piedras Coloradas Field, Argentina, 1999, SPE 53715.
Bryant et al., Reservoir engineering analysis of microbial enhanced oil recovery, 2002, SPE Reservoir Evaluation & Engineering, 365-374.
Nazina et al., Regulation of geochemical activity of microorganisms in a petroleum reservoir by injection of H2O2 or water-air mixture, Microbiology, 2008, vol. 77, No. 3, pp. 324-333.
Monastersky, Deep dwellers microbes thrive far below ground, Science News, 1997, vol. 151, No. 13, p. 192.

\* cited by examiner

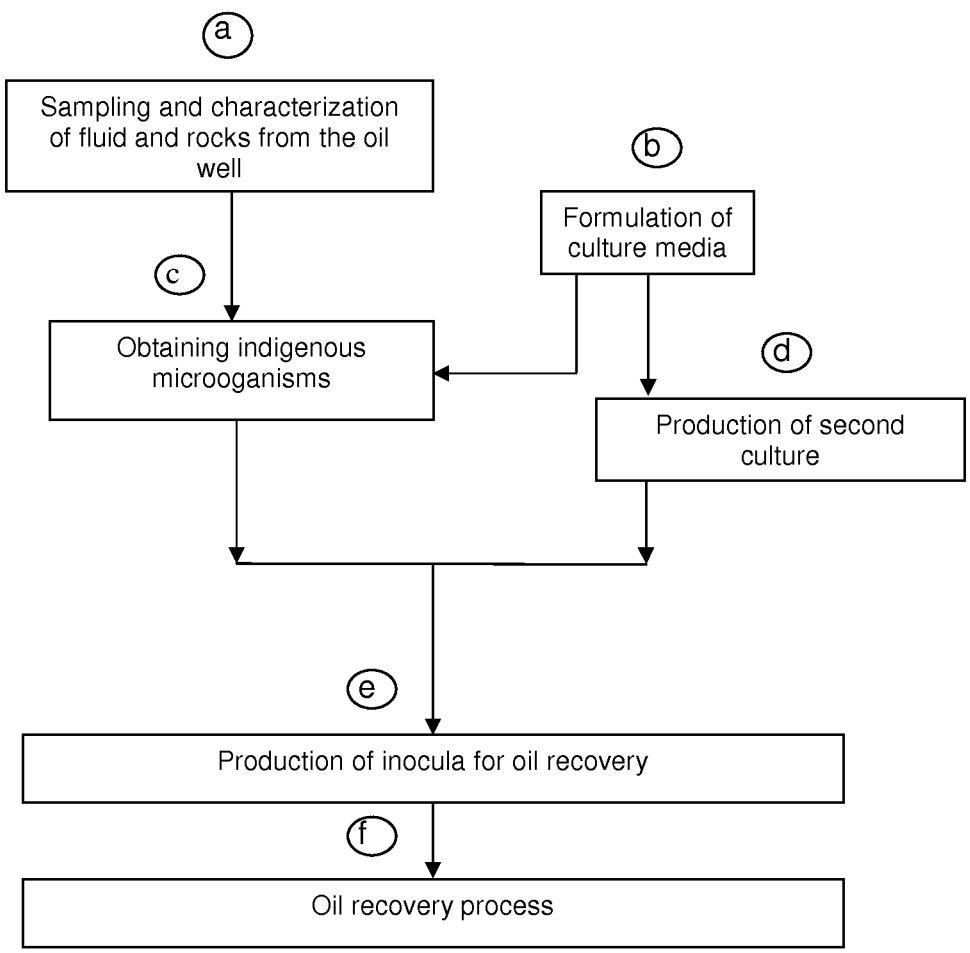

BIOTECHNOLOGICAL PROCESS FOR HYDROCARBON RECOVERY IN LOW PERMEABILITY POROUS MEDIA

CROSS-REFERENCE TO RELATED APPLICATION

This application claims the benefit under 35 U.S.C. §119 of Mexican Patent Application No. MX/a/2009/014146, filed Dec. 21, 2009, which is hereby incorporated by reference in its entirety.

FIELD OF THE INVENTION

The present invention relates to a biotechnological process for increasing hydrocarbon recovery with 14 to 25° API, contained in carbonate and/or clayey sandstone porous systems, with low permeability from 7 to 100 mD. The invention also increases recovery from oil wells that are associated with zones with a low hydrocarbon recovery factor. The activity of indigenous extremophile anaerobic microorganisms from the oil reservoir, as well as its metabolites, help oil mobility. The microorganisms are able to develop at temperatures ranging from 60 to 95° C., pressures from 7 to 154.6 $Kg/cm^2$ (100 to 2,200 psi) and NaCl content from 5,000 to 45,000 ppm, in anaerobic conditions.

BACKGROUND OF THE INVENTION

Currently, 85% of the world's crude oil production is by means of primary and secondary recovery, with an approximately 35% recovery of the oil existing in the reservoir (Babadagli T., 2007: Development of mature oil fields—A review. J. Petroleum Science Engineering 57: 221-246). Since the recovery rate is low, enhanced recovery methods have been implemented, often referred to as EOR (Enhanced Oil Recovery). Oil Recovery can be classified into three processes:

1. Primary recovery oil is produced using the energy from the oil or gas reservoir and/or forcing it through using pumps.
2. Secondary recovery consists of an increase in pressure in the reservoir by means of an external energy source. For instance, fluid injection in the rock of the reservoir is a common process to carry higher volumes of petroleum to the surface. More than 25% of petroleum is recovered this way.
3. Tertiary or EOR oil recovery from a reservoir after recovery by primary or secondary methods, involve reservoir heating or use of chemicals. Procedures for tertiary recovery include injecting into the reservoirs, miscible solvents, hydrocarbonated gases or carbonic gas, as well as soda water, tensoactives or hydrosoluble polymers, including any type of process used to supply the reservoir of an additional source of energy to enhance petroleum recovery compared to that produced during primary and secondary recovery processes.

Reservoir production starts with the natural flow of crude oil due to the energy in the reservoirs, and later water and gas injection, like in the secondary recovery processes. Tertiary or EOR methods are not widely used, because of the high costs and complexity of required equipment. Such processes are used to maximize long term economic value of the reservoir.

Low recovery of petroleum in reservoirs is due to several factors: low permeability, high viscosity of oil, high interfacial tension within water and petroleum, and high capillarity forces, that result in low mobility (Chisholm et al., 1990: Microbial enhanced oil recovery: interfacial tension and gas-induced relative permeability effects. SPE: 20481, 8).

Since secondary recovery processes have economic and/or practical limitations in their application, the development of innovative technologies is required to further exploit processes (Planckaert M., 2005: Oil reservoirs and oil production. In Petroleum Microbiology. Ollivier B. and Magot M. (Ed.), ASM Press, Washington D.C. 3-19). Tertiary or EOR processes used to increase the productive life of oil wells; including water or other liquid injection to force oil towards production oil wells. The properties of oil can be modified by adding surfactants that can in turn modify the wettability of the rock containing the oil (Mukherjee et al., 2006: Towards commercial production of microbial surfactants. Trends Biotechnol. 24 (11):509-15; Singh et al., 2007: Surfactants in microbiology and biotechnology: Part 2. Application and aspects. Biotechnology Advances 25:99-121; Youssef et al., 2007: In situ biosurfactant production by *Bacillus* strains injected into a limestone petroleum reservoir. Appl. Environ. Microbiol. 73 (4):1239-47).

Hydrocarbon recovery by means of microbial processes is a type of tertiary or EOR technology. This technology has been shown to increase the production of oil in wells and reservoirs, and is environmentally-friendly and economically efficient (Maure et al., 1999: Microbial enhanced oil recovery pilot test in Piedras Coloradas field, Argentina. SPE 53715; Bryant R and Lockhart T. P., 2002: Reservoir engineering analysis of microbial enhanced oil recovery. SPE Reservoir Evaluation & Engineering, 365-374; Nazina et al., 2008: Regulation of geochemical activity of microorganisms in a petroleum reservoir by injection of $H_2O_2$ or water-air mixture. Microbiology 77 (3): 324-333).

Extremophile microorganisms can live in environments considered unsuitable for most organisms, including petroleum reservoirs that are typically characterized by high temperature, salinity and pressure. Therefore, the indigenous microorganisms from a reservoir have been selected for optimal survival under such extreme conditions. (Monastersky R., 1997: Deep dweller microbes thrive far below ground. Science 151 (13):192-193).

In International Patent Application No. WO 2009/009382 A3, "Process for enhanced oil recovery using a microbial consortium", published on Jan. 15, 2009, Soni et al. propose a method that includes selection of the oil well. The characteristics considered for the application of such a process were oil well depth <3,048 m (10,000 ft), temperature <90° C., pressure <300 $Kg/cm^2$, pH from 4 to 9 but preferably from 6 to 8, and total salinity of formation water <12% (<10% NaCl). Microbiological prospecting and selection of microorganisms were carried out by using 4 different culture media supplemented with nutrients, minerals and a carbon source. This process involved the injection of the media and microorganisms into a selected oil well and incubation of the microbial consortium for one to three weeks to facilitate release of oil and increase recovery.

U.S. Published Patent Application No. 20070092930 A1 entitled "Process for enhanced recovery of crude oil from oil wells using novel microbial consortium", published on Apr. 26, 2007 by Lal et al. discloses a process for hydrocarbon recovery, wherein a mixed culture of thermophiles, barophiles and acidogenic anaerobe bacteria were developed in culture media containing nutrients, minerals and a complex carbon source. Incubation and enrichment of the microorganisms was carried out at temperatures ranging from 70 to 90° C. The microorganisms were obtained from samples collected under strict anaerobic conditions. During enrichment of the samples, production of $CO_2$, $CH_4$, biosurfactants, fatty acids and alcohol metabolites were observed, indicating growth and development of microorganisms. Recovery experiments were carried out in packed granular systems and Berea sandstone cores, with 148 mD permeability, 19% porosity and a 27.9% residual saturation. Oil recovery was reported to be 8.9%. U.S. Published Patent Application No. 20070181300 A1 entitled "System and method for preparing near-surface heavy oil for extraction using microbial degradation" published on Aug. 9, 2007 by Bushe and Rollins discloses a heavy oil recovery system that uses bacteria and fungi, with the addition of nutrients. The application field of this patent is oil located near the reservoir surface, implying that the invention is used at relatively low temperatures and pressures. The mechanisms that influence oil mobility include a decrease in viscosity, production of metabolites, such as gases and acids, and hydrocarbon biodegradation. The patent application does not disclose oil density intervals or API Gravity for applicability of the invention.

U.S. Pat. No. 5,163,510 entitled "Method of microbial enhanced oil recovery" and issued Nov. 17, 1992 to Sunde discloses a method to enhance oil recovery in rock by using exogenous aerobic microorganisms and nutrient (N and P) addition. Experiments describe the use of cores with 700 mD permeability and incubation at 45° C. to obtain a residual oil recovery of 9% after secondary recovery. The characteristics of the oils to which the process can be applied are not specified. Mechanisms attributable to recovery are: $CO_2$ and bio-surfactants production, as well as hydrocarbon degradation.

In many of the stated references, oil recovery using microorganisms has been carried out in high permeability systems, such as Berea sandstone with a 148 mD permeability or systems with higher permeability (packed systems). On the other hand, such references do not disclose the permeability of the system used or other important characteristics of the oil, such as viscosity, API Gravity and pressure conditions, or referring that the microorganisms are resistant to high pressure conditions.

There is a continuing need for technologies focused on low permeability systems (lower than 100 mD), high pressures (up to 154.6 Kg/cm$^2$; 2,200 psi) and high temperatures (above 60° C.), which are conditions in many Mexican fields.

SUMMARY OF THE INVENTION

The mentioned technologies do not supply an alternative solution to the oil recovery problem with an gravity >14° API and found in porous media with permeability lower than 100 mD. The present invention is a biotechnological process for enhancing oil recovery in an API Gravity of 14 to 25, containing rock and/or clayey sandstone porous systems with low permeability >7 mD. Through the stimulated activity of indigenous anaerobic extremophile microorganisms and their metabolites to increase the mobility of oil, the invention is particularly applicable to oil wells associated with zones with low permeability and a low oil recovery factor.

The present invention is a biotechnical process for oil recovery from an oil well having low permeability rock in the range of 7 to 100 mD, which comprises:
  a) obtaining a fluid sample and a rock sample from the oil well, characterization of the samples collected, and determining the temperature, pressure and salinity conditions in the oil well;
  b) formulating a culture media for development of a first culture of extremophile anaerobic indigenous microorganisms,
  c) culturing microorganisms from the fluid sample (a) in the culture media (b) to isolate extremophile anaerobic indigenous microorganisms thereby producing the first culture having characteristics of metabolite production at 60 to 95° C., NaCl concentrations of from 5,000 to 45,000 ppm, while under pressures from 7 to 154.6 Kg/cm$^2$ (100 to 2,200 psi) in anaerobic conditions,
  d) providing a second culture containing at least one of the microorganisms selected from the group consisting of *Thermoanaerobacter ethanolicus, Thermoanaerobacter uzonensis, Thermoanaerobacter inferii, Geothermobacterium* sp, *Methanobacterium subterraneum, Methanobacterium formicicum, Methanolinea tarda* and *Methanoculleus* sp adapted to a temperature in the range of 60 to 95° C., NaCl concentrations of from 5,000 to 45,000 ppm, and pressures of from 7 to 154.6 Kg/cm$^2$ (100 to 2,200 psi), e) producing an inoculum for oil recovery comprising a mixture of the first and second cultures,
  f) injecting the inoculum and water into the oil well and closing the oil well for 5 to 10 days to allow for metabolite production that increases oil recovery.

Thus, one aspect of the present invention is to provide a biotechnological process to enhance hydrocarbon recovery located in carbonate rock and/or clayey sandstone systems with 7 to 100 mD permeability.

An additional feature of the present invention is to provide a biotechnological process to enhance hydrocarbon recovery, using indigenous extremophile anaerobic microorganisms that are thermophilic, barophilic, halotolerant and acidotolerant. Furthermore, the metabolites produced by the microorganisms, such as surfactants, gases, acids and solvents, increase the mobility of oil at temperatures ranging from 60 to 95° C., pressures from 7 to 154.6 Kg/cm$^2$ (100 to 2,200 psi) and NaCl concentrations ranging from 5,000 to 45,000 ppm under anaerobic conditions. The microorganisms are thermophilic, barophilic, acidogenic and anaerobic.

The present invention provides a process for increasing recovery of oil from porous rock or strata with low permeability that cannot be easily recovered by other methods. The process is particularly suitable for use with oil having 14 to 25° API. The process includes: obtaining rock and fluid samples from the oil well. The samples are characterized. The fluid sample is analyzed for microbial content and, the oil well is analyzed to determined temperature, pressure and salinity of the environment from which the microorganisms were found. A culture media is formulated for culturing the microorganisms obtained from the oil well. The indigenous microorganisms are anaerobes that are capable of growing at temperatures ranging from 60 to 95° C., salinities (NaCl) from 5,000 to 45,000 ppm, and pressures from 7 to 154.6 kg/cm$^2$ (100 to 2,200 psi), all in the presence of oil of 14 to 25° API. These extremophile anaerobic indigenous microorganisms that are cultured on the culture media are termed the "first culture."

A culture media is then prepared containing one or more of the following microorganisms selected from the group consisting of *Thermoanaerobacter ethanolicus, Thermoanaerobacter uzonensis, Thermoanaerobacter inferii, Geothermobacterium* sp, *Methanobacterium subterraneum, Methanobacterium formicicum, Methanolinea tarda* and/or *Methanoculleus* sp, to form a "second culture." An inoculum is then prepared from a mixture of the first and second cultures which are injected into the oil well with the following conditions: pressure of 7 to 154.6 Kg/cm$^2$ and at a temperature of 60 to 95° C. After a period of time, the oil is recovered from the oil well.

Another feature of the invention is to provide a process for injecting a mixture of indigenous microorganisms and culture media into a porous rock containing heavy oil of 14-25° API. The mixture is injected into the well for a period sufficient to allow the growth of the microorganisms. The nutrient growth media can be included in an amount effective to culture the microorganisms in amounts to enhance oil recovery from the well by the effect of the microorganisms. The mixture is injected into the oil well for a time and at a temperature sufficient to enable the microorganisms to grow and reduce the viscosity of the oil whereby the oil can be recovered from the well.

Another feature of the invention is the ability to decrease the content of aromatic compounds in the oil and convert the aromatic compounds to lower molecular weight compounds, such as aliphatic or lower molecular weight aromatic compounds. The process includes the step of injecting a mixture of cultured indigenous microorganisms obtained from the oil well and a second culture of one or more microorganisms selected from the group consisting of *Thermoanaerobacter ethanolicus, Thermoanaerobacter uzonensis, Thermoanaerobacter inferii, Geothermobacterium* sp, *Methanobacterium subterraneum, Methanobacterium formicicum, Methanolinea tarda* and/or *Methanoculleus* sp. The microorganisms produce metabolites that in the conditions of pressure and temperature of the oil well, convert the higher molecular weight aromatic compounds into lower molecular weight compounds.

Accordingly, a preferred embodiment of the present invention is a biotechnological process for oil recovery from an oil well having low permeability rock in the range of 7 to 100 mD, which comprises:

a) obtaining a fluid sample and a rock sample from the oil well, characterization of the samples collected, and determining the temperature, pressure and salinity conditions in the oil well;

b) formulating a culture media for development of a first culture of extremophile anaerobic indigenous microorganisms, c) culturing microorganisms from the fluid sample (a) in the culture media (b) to isolate extremophile anaerobic indigenous microorganisms thereby producing the first culture having characteristics of metabolite production at 60 to 95° C., NaCl concentrations of from 5,000 to 45,000 ppm, while under pressures from 7 to 154.6 Kg/cm$^2$ (100 to 2,200 psi) in anaerobic conditions, d) providing a second culture containing at least one of the microorganisms selected from the group consisting of *Thermoanaerobacter ethanolicus, Thermoanaerobacter uzonensis, Thermoanaerobacter inferii, Geothermobacterium* sp, *Methanobacterium subterraneum, Methanobacterium formicicum, Methanolinea tarda* and *Methanoculleus* sp adapted to a temperature in the range of 60 to 95° C., NaCl concentrations of from 5,000 to 45,000 ppm, and pressures of from 7 to 154.6 Kg/cm$^2$ (100 to 2,200 psi), e) producing an inoculum for oil recovery comprising a mixture of the first and second cultures, f) injecting the inoculum and water into the oil well and closing the oil well for 5 to 10 days such that microorganisms modify aromatic content of the oil in the oil well during the well closure by converting aromatic compounds in the oil to lower molecular weight compounds during the well closure.

BRIEF DESCRIPTION OF THE DRAWINGS

FIG. 1 shows, by means of a block diagram, the different stages that comprise the biotechnological process of the present invention, which involves a) Sampling and characterization of fluids and rocks from the oil well b) Formulation of the culture media, c) Forming a first culture from indigenous microorganisms, d) Providing a second microbial culture, e) Production of the inocula for oil recovery, and f) Oil recovery process.

DETAILED DESCRIPTION OF THE INVENTION

The present invention relates to a biotechnological process that enhances recovery of oil with 14 to 25° API, contained in carbonate containing rock and/or clayey sandstone porous systems with a permeability from 7 to 100 mD. The process of the invention is suitable for oil reservoirs associated with zones with a low oil recovery factor. The process of the invention uses the indigenous anaerobic, extremophile microorganisms that are thermophilic, barophilic, halotolerant and acidotolerant and their metabolites, such as surfactants, gases, acids and solvents, to improve the mobility of oils.

The biotechnological process of the present invention is based on the sampling and characterization of fluids and rocks from the oil reservoir. The formulation of culture media based on the oil reservoir environment. Obtaining and characterization of indigenous microorganisms from the oil well, and the kinetic evaluation of metabolite production useful in the oil recovery.

The microorganisms and the substrates are incorporated into the oil well. After the well is closed for a period of from 5 to 10 days (for incubation), the microorganisms and the synthesized metabolites increase oil recovery. These anaerobic microorganisms can grow at temperatures ranging from 60 to 95° C., pressures from 7 to 154.6 kg/cm$^2$ (100 to 2,200 psi) and NaCl concentrations from 5,000 to 45,000 ppm.

FIG. 1 illustrates, by means of a block diagram, the different stages involved in the biotechnological process of the present invention.

a) Sampling and Characterization Fluids and Rocks from the Oil Well.—

This step includes collecting samples of rock and fluids from the oil well (oil and water) for characterization and determination of oil API Gravity, type of porous media (clayey sandstone and/or carbonate rock), rock porosity, rock permeability, as well as the microbial growth conditions: such as temperature, pressure and salinity of the well. The samples from the oil well must be kept at 4° C. for preservation until further analysis.

b) Formulation of the Culture Media.—

This step includes determining the formulation of nutrients for the extremophile microorganisms used in the present invention. The formulation comprises of the components listed in Table 1 and trace elements listed in Table 2.

TABLE 1

Nutrients formulation from the culture media

| Compound | Concentration, (g/l) |
| --- | --- |
| NaCl | 5.0-45.0 |
| NH$_4$Cl | 0.1-0.50 |
| K$_2$HPO$_4$ | 0.1-0.40 |
| MgCl$_2$ 6H$_2$O | 0.5-1.5 |
| CaCl$_2$ 2H$_2$O | 0.05-0.2 |
| KCl | 0.2-0.4 |
| NiCl$_2$ 6H$_2$O | 0.025-0.05 |
| Yeast extract | 1.0-4.0 |
| Tryptone peptone | 1.0-4.0 |
| Cisteine-HCl | 0.1-0.5 |
| Molasses | 2.0-15.0 |

TABLE 1-continued

Nutrients formulation from the culture media

| Compound | Concentration, (g/l) |
|---|---|
| Resazurin 0.1% | 1.0 (ml/l) |
| Trace elements | 5.0-10.0 (ml/l) |

TABLE 2

Trace elements formulation like nutrients from the culture media

| Compound | Concentration, (g/l) |
|---|---|
| $MgSO_4$ | 2.0-3-0 |
| $MnSO_4$ | 0.5-1.0 |
| NaCl | 1.0-2.0 |
| $FeSO_4$ | 0.1-0.2 |
| $CoSO_4$ | 0.1-0.2 |
| $CaCl_2$ | 0.1-0.2 |
| $ZnSO_4$ | 0.1-0.2 |
| $CuSO_4$ | 0.01-0.05 |
| $B(OH)_3$ | 0.01-0.03 |
| $Na_2MoO_4\,2H_2O$ | 0.01-0.03 |
| $NiCl_2$ | 0.025-0.05 |

This stage also comprises the mineral media formulation, and sterilization condition (1.05 Kg/cm$^2$ and 122° C. for 22 min.). This step includes the order of additions of components, its maintenance in anoxic conditions and the adjustment of the hydrogen potential.

c) Obtaining Indigenous Microorganisms (Forming a First Culture).—

This step includes the selection, activation and preservation of extremophile microorganisms obtained from 14 to 25° API oil samples from the oil well and capable of producing useful metabolites to enhance oil recovery. This stage includes:

Indigenous microorganisms are isolated from the preserved samples from the oil well. Microbiological methods are carried out in anaerobic conditions, with a Nitrogen atmosphere in all the steps, temperatures ranging from 60 to 95° C. (preferably from 70 to 80° C.), and NaCl content from 5,000 to 45,000 ppm in mineral media. Different carbon sources, such as molasses, glucose and sucrose, are evaluated at different concentrations. Microorganism can grow at the mentioned temperatures and salinities, as well as pressures ranging from 7 to 154.6 kg/cm2 (100 to 2200 psi) in the presence of oil 14 to 25° API.

The microorganisms from oil samples are cultured in a media formulated for the development of useful organisms for oil recovery, obtaining anaerobe cultures adapted to temperature conditions from 60 to 95° C., salinity from 5,000 to 45,000 ppm a NaCl content, and pressure from 7 to 154.6 Kg/cm2 (100 to 2,200 psi) from the oil well, and which can develop in the presence of oils from 14 to 25° API;

From the preserved samples of the collected fluids microorganisms are obtained. The microbiological processes are carried out in anaerobic conditions, with $N_2$ atmosphere in all the steps in mineral media, complying with the nutritional requirements of the microorganisms. Different carbon sources are evaluated such as: molasses, glucose and sucrose at different concentrations;

The different microbial groups present in the system are determined such as fermentatives, methanogen, sulphate reducers, among others. The balance of nutrients is determined (media formulation) and the most suitable salinity conditions for the production of metabolites useful to enhance oil recovery is determined. The selection of cultures is carried out based on its activity to produce surfactants, gases, acids and solvents, among others.

Microorganisms are stabilized by periodical culturing in fresh media at temperatures from 60 to 95° C. and NaCl content from 5,000 to 45,000 ppm.

The microorganisms are fixed on an inert support in atmosphere of $N_2$ and sterile conditions for their preservation. The effectiveness of the method is determined by culturing the fixed microorganisms in fresh media.

d) Production of Second Culture.—

This step includes preparing the culture media for stimulating microorganisms useful for enhance oil recovery, adapted to temperature conditions from 60 to 95° C., preferably from 70 to 80° C., salinity from 5,000 to 45,000 ppm with NaCl content and pressure from 7 to 154 Kg/cm2 (100 to 2,200 psi), able to develop in the presence of oils from 14 to 25° API:

The microbial culture designated as the "Second culture" is comprised of microorganisms: thermophiles, barophiles, halotolerants, acidotolerants, and anaerobes; containing the following microorganisms: *Thermoanaerobacter ethanolicus, Thermoanaerobacter uzonensis, Thermoanaerobacter inferii, Geothermobacterium* sp, *Methanobacterium subterraneum, Methanobacterium formicicum, Methanolinea tarda* and/or *Methanoculleus* sp;

e) Inoculum Production for Oil Recovery.—

The inoculum is made up by the First Culture of indigenous microorganisms from the oil well: stage c), and the Second culture from the stage d);

f) Oil Recovery Tests in Porous Media:

Non-Consolidated Systems.—

This step includes the addition of the microbial culture the first culture of indigenous microorganisms from the oil well c), and the second culture from the stage d)) and nutrients to the porous media saturated with oil and evaluation of oil recovery (Example 1).

Consolidated Systems (Core).—

This step includes the addition of the microorganisms ((the first culture of indigenous microorganisms from the oil well c), and the second culture from the stage d)) and culture media to the porous media, along with water injection. The system is closed for a period from 5 to 10 days, leading to the microbial development and the metabolites synthesis in the system to enhance oil mobility and recovery (Examples 2 to 5).

Well.—

This step includes the biotechnological process in the oil well used to enhance hydrocarbon recovery after a secondary recovery process (Example 6).

The biotechnological process of the present invention comprises biostimulation and bioaugmentation of microorganisms in low permeability porous media, from 7 to 100 mD, at temperatures ranging from 60 to 95° C., preferably from 70 to 80° C., pressures from 7 to 154.6 kg/cm$^2$ (100 to 2,200 psi), salinities (NaCl) from 5,000 to 45,000 ppm under anaerobic conditions.

The metabolites obtained during the biotechnological process in the present invention include surfactants, gases (carbon dioxide, methane and hydrogen), acids (acetic, butyric and propionic), and solvents (ethanol and acetone). Such metabolites enhance oil mobility from 14 to 25° API through various mechanisms, such as pressurization, dissolution, emulsification and reduction of viscosity.

The biotechnological process of the present invention can be applied to porous media, sandstone and carbonate rock with 15 to 25% porosity.

The biotechnological process of the present invention leads to additional oil recovery up to 30% after secondary recovery processes in porous media.

EXAMPLES

Some practical examples of the present invention are described below.

Example 1

Oil Enhanced Recovery

In Non-Consolidated Porous Media Using Microorganisms Oil recovery from porous media obtained from clayey sandstone and carbonate rocks was evaluated. The rocks were ground, meshed and selected based size ranging from 200 to 500 μm. 30 g of rock were added per system and covered, sealed and sterilized. The rocks were impregnated up to saturation with oils from 14 to 25° API using vacuum in a $N_2$ atmosphere. Under sterile conditions, the mineral media (Tables 1 and 2), the carbon source, the first culture of indigenous microorganisms and the second culture were added. The systems were incubated at 60 to 95° C. for 5 to 10 days. Production of gas, surfactants, solvents and acids was monitored, as well as consumption of sugar and oil recovery.

In the example, microorganisms enhanced oil recovery, obtaining an oil recovery above 24%.

The presence of metabolites (surfactants, gases, acids and solvents) was detected in all inoculated systems, promoting the mobility of oils from 14 to 25° API.

Example 2

Oil Recovery Tests in Consolidated Porous Media Using Microorganisms

For oil recovery experiments, carbonate core was used (10×5 cm), as well as oil from Mexican fields (14-25° API). Core fragments used (10×5 cm) in the experimental cell were rinsed with solvents and vacuum dried at 80° C. The core composition is summarized in Table 3.

TABLE 3

Chemical composition or carbonated rocks

| Compound | Rock composition % |
|---|---|
| $CaCO_3$ | 97.3 |
| $MgCO_3$ | 0.45 |
| $Al_2O_3$ | 0.55 |
| $SiO_2$ | 1.7 |

The experimental system consisted of a continuous injection pump, an oven for temperature control, transference cylinders, a differential pressure transducer, a data acquisition system and an experimental cell.

The experimental cell containing the core was placed inside an oven for temperature control from 60 to 95° C. Transference cylinders were used to displace fluids (brine, oil and inocula) using an injection pump. A differential transducer was installed to monitor pressure drops. A system was set up for gas sampling at the outlet of the experimental cell.

The core fragment was placed inside a rubber sleeve in the experimental cell. The pressure on the cell was held between 7 and 154.6 $Kg/cm^2$ (100 to 2,200 psi) during the experiment. The experimental cell was installed inside the displacement system, which was held at a vacuum for an hour. The brine along with the injection flow from 5 to 10 ml/h was later displaced, up to a constant differential pressure. Once the core was saturated, its porosity and permeability were determined, using different brine inlet flows. The core fragment was later saturated with oil from 14 to 25° API at a 5 to 10 ml/h flow to reach an approximate oil saturation of 80%. Secondary oil recovery was carried out by means of brine injection at a 5 to 10 ml/h flow.

Once the secondary recovery process was completed, the mineral media was injected with the carbon source, the inocula and the culture media at 5 to 10 ml/h flow until reaching 1.5-3.0 porous volume. The system was closed from 60 to 95° C. for 5 to 10 days. During this period, microorganisms produced metabolites (acids, surfactants, solvents and gases) that enhance oil mobility and recovery. The last phase consisted of brine injection at a 5 to 10 ml/h flow, thus displacing oil released by microorganisms. The oil was recovered and quantified at the system outlet.

Oil recovery from 18.17 to 20.2% of the original volume of core saturation was obtained due the microbial activity after a secondary recovery process.

Experimental conditions are reported in Table 4.

TABLE 4

Oil recovery conditions from Examples 2 and 4

| Characteristics | Example 2 | Example 4 |
|---|---|---|
| Microbian culture | $IMP^1$ and Indigenous | $IMP^1$ and Indigenous |
| API Gravity | 14 to 25 | 14 to 25 |
| Kinematic viscosity 30° C., mPa $s^{-1}$ | 30 to 50 | 30 to 50 |
| Brine, % NaCl | 5 to 50 | 5 to 50 |
| Type of rock | Carbonate-containing | Clayey sandstone |
| Length, cm | 10 | 14 |
| Diameter, cm | 10 | 5 |
| Temperature, ° C. | 60 to 95 | 60 to 95 |
| Presure, $Kg/cm^2$ (psi) | 7 to 154.6 (100 to 2,200) | 7 to 154.6 (100 to 2,200) |
| Porous volume, $cm^3$ | 35.7 | 208 |
| Porosity, % | 18.1 | 19.73 |
| Permeability, mD | 7 to 15 | 90 to 100 |
| Flow, ml/h | 5 to 10 | 5 to 10 |
| initial oil saturation, % | 78.43 | 70.2 |
| Brine saturation, % | 21.57 | 19.8 |
| Brine injection recovery (secondary), % | 30.47 to 33.53 | 45.3 to 49.45 |
| Biotechnological process recovery of the present $invention^2$, % | 18.17 to 20.23 | 20.6 to 25.4 |
| Total recovery % (secondary plus biotechnological process) | 48.6 to 53.7 | 65.9 to 74.89 |
| Detected metabolites | Acids, gases, surfactants and solvents | Acids, gases, surfactants and solvents |

[1]The indigenous culture is made up of microorganisms isolated from oil from a Mexican petroleum well.
[2]Recovery was due to a biotechnological process application of the present invention, additional to that obtained in the secondary recovery process (water injection).

Example 3

All of the conditions used were identical to those of Example 2, except for the addition of microorganisms and nutrients, which was carried out over three injection cycles and then the system was closed for periods of 5 to 10 days. The additional oil recovery obtained by means of the biotechnological process from the present invention ranged from 20.1 to 24.3% after a secondary recovery process.

Example 4

All conditions used were identical to those of Example 2, except for the use of Berea sandstone (14×10 cm), which has a chemical composition described in Table 5.

TABLE 5

Chemical composition of the Berea sandstone rock

| Compounds | Composition of the sandstone rock (%) |
|---|---|
| $SiO_2$ | 93.13 |
| $Al_2O$ | 3.86 |
| $Fe_2O_3$ | 0.11 |
| FeO | 0.54 |
| MgO | 0.25 |
| CaO | 0.10 |
| Others | 2.01 |

Additional oil recovery from 20.6 to 25.4% due to microbial activity was obtained after a secondary recovery process.

Example 5

All the conditions used were identical to those of Example 4, except for the addition of nutrients and microorganisms, which was carried out over three injection cycles, then system was closed for periods of 5 to 10 days. Additional oil recovery from 25.1 to 29.9% by the biotechnological process of the present invention was observed after a secondary recovery process.

Example 6

To carry out the oil recovery test in an oil well, culture media was prepared using the following nutrients in g/l: NaCl (15-35), $NH_4Cl$ (0.2-0.4), $K_2HPO_4$ (0.1-0.3), $MgCl_2 6H_2O$ (0.7-1.3), $CaCl_2 2H_2O$ (0.05-0.1), KCl (0.25-0.3), $NiCl_2 6H_2O$ (0.03-0.04) yeast extract (1.0-3.0), tryptone peptone (1.0-3.0), cysteine-HCl (0.1-0.3), molasses (4.0-10.0), resazurin 0.1% (1.0 ml/l), and trace elements solution (6.0-8.0 ml/l, according to Table 2).

Culture media was sterilized with heat at 122° C. and 1.05 Kg/cm² (15 psi) for 22 min. Culture media was kept in anaerobic conditions, in suitable cells. The second culture and indigenous culture from the oil well (first culture) were added. The microorganisms were selected by its capacity to produce metabolites like acids, surfactants, solvents and gases, enhancing the oil recovery conditions.

The microorganism cultures (the second culture and indigenous culture from the oil well) and nutrients were prepared ex situ. They were confined in suitable reservoirs to guarantee its stability during transportation to the application point. Transfer cylinders were used to transport the fluids (nutrients and inocula) using an injection pump. The monitoring system included a differential transducer to monitor pressure drops, and a sampling system was implemented.

Culture media, the inoculum, the carbon source and water were pumped into the oil well. The oil well was closed for 5 to 10 days. Microorganisms produced metabolites, including carbon dioxide, methane, hydrogen, surfactants, ethanol, and acetic acid, improving oil recovery.

The oil increase obtained from the recovery by the microbial process was 11.3% additional to secondary recovery process.

Example 7

For a better comprehension of effect of the microorganism activity used in the biotechnological process of the present invention, the composition of hydrocarbon fractions at the different steps of the process of Example 3, are shown in Table 6.

Initial oil.—Oil from the oil well, such as the one used in Example 3.

Impregnation oil.—Effluent resulting from oil saturation in the core, as stated in Example 3.

Secondary recovered oil.—Effluent obtained as a result of the recovery process by means of brine injection, as stated in Example 3.

Microbial recovered oil.—Oil from the microbial recovery process, as stated in Example 3.

TABLE 6

SARA Analysis of oil used in Example 3

| Oil Sample | Saturates | Resins | Aromatics | Asphaltenes |
|---|---|---|---|---|
| Initial oil | 19.81 | 12.57 | 58.9 | 8.72 |
| Impregnation oil | 19.55 | 18.63 | 54.27 | 7.55 |
| Secondary recovered oil | 18.59 | 18.85 | 54.92 | 7.64 |
| Microbial recovered oil | 29.81 | 18.57 | 42.86 | 8.76 |

Results from Table 6 show that, due to the biotechnological process of the present invention, microorganisms were able to modify aromatic hydrocarbons and convert them into aliphatic (saturates) or aromatic compounds of a lower molecular weight. The decrease of the aromatic compounds in "microbial recovered oil" was 16%, implying that the microorganisms present in the process of this example have the capacity to degrade these types of compounds.

Regarding the saturated fraction, no significant differences in the "Initial oil" or "Impregnation oil" and "Secondary recovered oil" were observed. However, in the "microbial recovered oil", there was a 10% increase; that can be related to aromatics degradation.

What is claimed is:

1. A biotechnological process for oil recovery from an oil well having low permeability rock in the range of 7 to 100 mD, which comprises:
   a) obtaining a fluid sample and a rock sample from said oil well, characterization of the samples collected, and determining the temperature, pressure and salinity conditions in said oil well;
   b) formulating a culture media for development of a first culture of extremophile anaerobic indigenous microorganisms,
   c) culturing microorganisms from said fluid sample (a) in said culture media (b) to isolate extremophile anerobic indigenous microorganisms thereby producing said first culture having characteristics of metabolite production at 60 to 95° C., NaCl concentrations of from 5,000 to 45,000 ppm, while under pressures from 7 to 154.6 Kg/cm² (100 to 2,200 psi) in anaerobic conditions,
   d) providing a second culture containing at least one microorganism selected from the group consisting of *Thermoanaerobacter ethanolicus, Thermoanaerobacter uzonensis, Thermoanaerobacter Geothermobacterium sp, Methanobacterium subterraneum, Methanobacte-*

*rium formicicum, Methanolinea tarda* and *Methanoculleus* sp adapted to a temperature in the range of 60 to 95° C., NaCl concentrations of from 5,000 to 45,000 ppm, and pressures of from 7 to 154.6 Kg/cm$^2$ (100 to 2,200 psi), e) producing an inoculum for oil recovery comprising a mixture of said first and second cultures, f) injecting said inoculum and water into said oil well and closing said oil well for 5 to 10 days to allow for metabolite production that increases oil recovery.

2. A biotechnological process of claim 1, wherein said oil is located in said oil well having a permeability of from 7 to 100 mD, a temperature of 60 to 95° C., a pressure of 7 to 154.6 Kg/cm$^2$ (100 to 2,200 psi), and a salinity of 5,000 to 45,000 ppm (NaCl).

3. A biotechnological process of claim 1, wherein said low permeability rock comprises sandstone or carbonate-containing rock.

4. A biotechnological process of claim 1, wherein said porous low permeability rock has a 15 to 25% porosity.

5. A biotechnological process of claim 1, wherein the extremophile anaerobic indigenous microorganisms from said oil well are thermophilic, barophilic, halotolerant and acidotolerant, and able to grow at temperatures of 60 to 95° C., pressures from 7 to 154.6 Kg/cm$^2$ (100 to 2,200 psi) and NaCl content from 5,000 a 45,000 ppm, under anaerobic conditions.

6. A biotechnological process of claim 1, wherein a nutrient formulation for said culture media for said extremophile anaerobic indigenous microorganisms comprises: NaCl, NH$_4$Cl, K$_2$HPO$_4$, MgCl$_2$6H$_2$O, CaCl$_2$2H$_2$O, KCl, NiCl$_2$6H$_2$O, Yeast extract, Triptone peptone, Cisteine HCl, Molasses, and Resazurin, and trace elements MgSO$_4$, MnSO$_4$, NaCl, FeSO$_4$, CoSO$_4$, CaCl$_2$, ZnSO$_4$, CuSO$_4$, B(OH)$_3$, Na$_2$MoO$_4$2H$_2$O, and NiCl$_2$.

7. A biotechnological process of claim 1, wherein said first culture, which is an extremophile anaerobic indigenous culture is made up of microorganisms that produce metabolites including surfactants, gases, acids and solvents, to improve oil mobility of oil having 14 to 25° API oil.

8. A biotechnological process of claim 1, wherein the temperature at which said first culture of extremophile anaerobic indigenous microorganisms is cultured is from 70 to 80° C.

9. A biotechnological process of claim 1, further comprising preserving said first culture prepared in stage c) is by means of fixing said microorganisms on an inert support, in N$_2$ atmosphere and in sterility conditions.

10. A biotechnological process of claim 1, wherein the injecting of said inoculum and water to the well, in stage f), is performed in a confinement period of from 5 to 10 days, over one or several injections leading to microbial development and metabolite production.

11. A biotechnological process of claim 1, wherein up to 30% of oil is recovered by the combination of said biotechnological process and a secondary recovery process in said oil well.

12. A biotechnological process of claim 1, wherein microorganisms modify aromatic content of the oil during the well closure in step f) by converting aromatic compounds in the oil of said oil well to lower molecular weight compounds.

13. A biotechnological process for oil recovery from an oil well having low permeability rock in the range of 7 to 100 mD, which comprises:

a) obtaining a fluid sample and a rock sample from said oil well, characterization of the samples collected, and determining the temperature, pressure and salinity conditions in said oil well;

b) formulating a culture media for development of a first culture of extremophile anaerobic indigenous microorganisms, c) culturing microorganisms from said fluid sample (a) in said culture media (b) to isolate extremophile anerobic indigenous microorganisms thereby producing said first culture having characteristics of metabolite production at 60 to 95° C., NaCl concentrations of from 5,000 to 45,000 ppm, while under pressures from 7 to 154.6 Kg/cm$^2$ (100 to 2,200 psi) in anaerobic conditions, d) providing a second culture containing at least one selected from the group consisting of *Thermoanaerobacter ethanolicus, Thermoanaerobacter uzonensis, Thermoanaerobacter inferii, Geothermobacterium* sp, *Methanobacterium subterraneum, Methanobacterium formicicum, Methanolinea tarda* and *Methanoculleus* sp adapted to a temperature in the range of 60 to 95° C., NaCl concentrations of from 5,000 to 45,000 ppm, and pressures of from 7 to 154.6 Kg/cm$^2$ (100 to 2,200 psi), e) producing an inoculum for oil recovery comprising a mixture of said first and second cultures, f) injecting said inoculum and water into said oil well and closing said oil well for 5 to 10 days such that microorganisms modify aromatic content of the oil in said oil well during the well closure by converting aromatic compounds in the oil to lower molecular weight compounds.

* * * * *